US012245016B2

(12) United States Patent
Elff

(10) Patent No.: US 12,245,016 B2
(45) Date of Patent: *Mar. 4, 2025

(54) AUDIO WORKSTATION CONTROL OVER COMPUTING NETWORKS

(71) Applicant: Little Dog Live LLC, New Paltz, NY (US)

(72) Inventor: Jody Elff, New Paltz, NY (US)

(73) Assignee: Little Dog Live, LLC, New Paltz, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 17/891,942

(22) Filed: Aug. 19, 2022

(65) Prior Publication Data

US 2022/0394411 A1 Dec. 8, 2022

Related U.S. Application Data

(63) Continuation of application No. 17/733,741, filed on Apr. 29, 2022, now Pat. No. 11,425,522.

(60) Provisional application No. 63/182,697, filed on Apr. 30, 2021.

(51) Int. Cl.
*H04S 7/00* (2006.01)
*H04L 12/46* (2006.01)

(52) U.S. Cl.
CPC .......... *H04S 7/30* (2013.01); *H04L 12/4633* (2013.01); *H04L 12/4641* (2013.01); *H04S 7/40* (2013.01)

(58) Field of Classification Search
None
See application file for complete search history.

(56) References Cited

U.S. PATENT DOCUMENTS

| | | | |
|---|---|---|---|
| 8,477,778 B2 * | 7/2013 | Lehmann, Jr. | H04L 65/1101 370/432 |
| 8,812,633 B2 | 8/2014 | Viger et al. | |
| 9,031,262 B2 * | 5/2015 | Silfvast | G10H 1/18 381/98 |
| 9,826,325 B2 | 11/2017 | Holladay et al. | |
| 11,363,314 B2 | 6/2022 | Nicol et al. | |
| 11,669,371 B2 * | 6/2023 | Masek | G06F 9/5077 718/104 |
| 2012/0203364 A1 | 8/2012 | Redmann | |
| 2014/0064519 A1 * | 3/2014 | Silfvast | G10H 1/18 381/119 |
| 2015/0294079 A1 | 10/2015 | Bergougnan | |
| 2021/0409138 A1 | 12/2021 | Blair et al. | |

FOREIGN PATENT DOCUMENTS

| | | |
|---|---|---|
| EP | 1580910 | 9/2005 |
| EP | 2728834 | 5/2014 |
| WO | WO2020/205175 | 10/2020 |

* cited by examiner

*Primary Examiner* — Paul W Huber
(74) *Attorney, Agent, or Firm* — Brownstein Hyatt Farber Schreck, LLP

(57) ABSTRACT

An audio mixing system including an on-site digital audio workstation and an off-site audio workstation may be provided. The on-site digital audio workstation may be configured to receive a number of audio data channels and may produce a multi-channel mix by mixing the number of audio data channels. The off-site audio workstation may be coupled, by a remote dynamic host configuration protocol server, to the digital audio workstation and may transmit mixing control data to the digital audio workstation, thereby changing properties of the multi-channel mix.

20 Claims, 5 Drawing Sheets

AUDIO WORKSTATION CONTROL OVER COMPUTING NETWORKS

CROSS-REFERENCE TO RELATED APPLICATION(S)

This application is a continuation of U.S. patent application Ser. No. 17/733,741 filed on Apr. 29, 2022, and entitled "Audio Workstation Control Over Computing Networks," and claims the benefit under 35 U.S.C. § 119 of U.S. Provisional Patent Application No. 63/182,697, filed on Apr. 30, 2021, and entitled "Systems and Methods for Networked Control of Audio Workstation for Localized Audio Sources," the contents of which is incorporated by reference in its entirety.

TECHNICAL FIELD

Embodiments described herein relate to audio workstations and, in particular, to systems and methods for off-site control of an audio workstation.

BACKGROUND

Live events require professional mixing of audio signals generated from on-site audio sources. For example, during a live event, audio signals from microphones, musical instruments, and other raw audio source devices are sent to an on-site audio workstation through multiple audio channels. The audio workstation includes a number of digital and/or analog controls to modify one or more properties of the audio signals carried by the multiple audio channels. The modified audio signals may be combined to generate a multi-channel output suitable for broadcast.

However, mixing of live performances typically requires an on-site audio workstation; off-site mixing of a live event is often impractical or impossible due to two-way per-channel latencies introduced when digitizing, encrypting, and transmitting multiple discrete raw audio channels to an off-site audio workstation.

SUMMARY

Embodiments described herein may take the form of a multi-site audio production system including at least a remote Internet Protocol (IP) address management system configured to define a common address between multiple sites, such as a first site and a second site.

Disposed at the first site may be a set of audio capturing or producing devices configured to transmit audio signals across a respective set of audio channels and one or more signal processing appliances configured to (1) receive, as input, the set of audio channels and (2) modify an audio signal of at least one audio channel. The first site can also include a first networking appliance communicably intercoupled to at least one of the signal processing appliances and the remote IP management service. The first site can also include a first audio workstation communicably intercoupled to the first networking appliance and to each of the one or more signal processing appliances.

Disposed at the second site may be a second networking appliance configured to (1) automatically establish, with the first networking appliance, a virtual private network between the first site and a second site and (2) automatically couple to the remote IP address management system. The second site can also include a second audio workstation communicably intercoupled to the second networking appliance including a control surface configured to receive inputs from an operator. The second audio workstation can be configured to receive an input to the control surface from the operator, generate command and control instructions in response to the input, and transmit the command and control instructions, via the virtual private network, to the first audio workstation to cause a change in operation of at least one of the one or more signal processing appliances.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
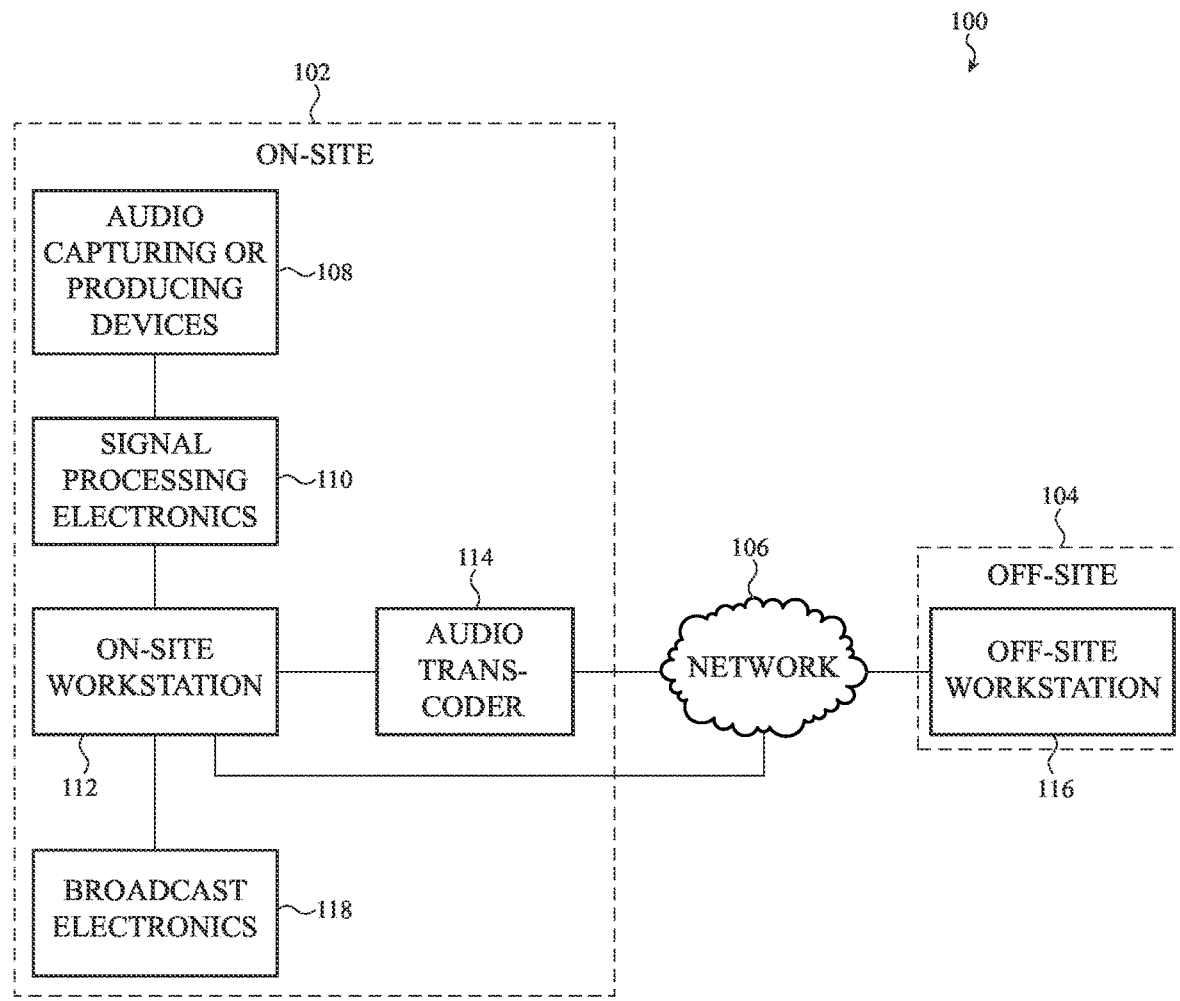
FIGS. 1A-1B depict an example audio production system including an off-site audio workstation communicably coupled to an on-site digital audio workstation via a network, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for command and control of an on-site audio workstation placed at a venue hosting a live event from an off-site audio workstation. In this manner, an off-site professional audio producer (herein a "professional audio producer" or "audio producer") of the off-site audio workstation can command and control the on-site audio workstation as though the off-site professional audio producer was physically present at the venue.

More specifically, inputs received at the off-site audio workstation can be encoded as digital command and control signals and transmitted, via a secure tunnel, to a local area network local to the on-site audio workstation. The on-site audio workstation performs actions and/or functions in response to the command and control signals, thereby modifying one or more properties of locally-captured audio signals carried by the multiple audio channels to the on-site audio workstation. Output from the on-site mixing station can thereafter be locally broadcast (e.g., via an on-site sound system) and/or can be broadcast via a network to one or more other endpoints, such as a remote attendee of a live event.

In this manner, audio signals captured at the venue (with on-site audio capture equipment) and mixed by the on-site mixing station, remain synchronized relative to one another, and are not at risk of degradations caused by, or as an effect of, conventional remote audio production systems.

More specifically, as known to a person of skill in the art, due at least in part to unpredictable network conditions, conventional systems and architectures that transmit raw audio channels captured on-site to remote workstations for live audio production often suffer from undesirable, unpredictable, and/or variable channel-specific latencies (desynchronizing channels relative to one another), channel specific network interruptions, and/or channel-specific compression/decompression losses.

Such conventional systems also consume significant bandwidth and compression/decompression processing and memory resources both on-site and off-site, increasing costs associated with construction, operation, and maintenance of such systems.

By contrast, as may be appreciated by a person of skill in the art, embodiments described herein consume significantly less bandwidth and processor and memory resources (both locally and remote) as compared to conventional remote audio production systems, as raw audio channels captured at a venue are not required to be digitized, compressed, encrypted, buffered, and/or transmitted to an off-site audio workstation.

More specifically, as a result of the constructions described herein, a professional audio producer controlling an off-site audio workstation can effectively, and in near real-time, control an on-site audio workstation, ensuring that production-quality audio output is provided on-site without requiring that the professional audio producer be physically present.

These constructions further allow for multiple professional audio producers to control a single on-site mixing station, from two or more different off-site locations. In another phrasing, audio producers of different skills or talents can cooperate to control the same on-site audio workstation, which may not be possible on-site due to the limited physical size of the on-site audio workstation.

In addition, multiple audio producers can hot-swap control of the on-site audio workstation; a first producer may control an on-site audio workstation to produce a first portion of a live event and a second producer may control the on-site audio workstation to produce a second portion of the live event. In other cases, a substitute audio producer can step in immediately if a network interruption disconnects a first audio producer from control of an on-site audio workstation. Further still, as may be appreciated by a person of skill in the art, if an off-site professional audio producer is disconnected from control of an on-site audio workstation, the current settings of the on-site audio workstation remain in place until the off-site audio workstation reconnects to the on-site audio workstation, minimizing perceivable interruption at the event site.

In view of the foregoing, more generally and broadly, the embodiments described herein relate to systems and methods for communicably coupling one audio workstation to another workstation over the open internet such that inputs provided to the first audio workstation are received and acted upon by the second workstation.

However, as may be known to a person of skill in the art, an audio workstation typically includes multiple discrete hardware apparatuses, communicably intercoupled together. In many cases, different hardware components (referred to herein as "audio production appliances," including devices such as mixers, equalizers, amplifiers, analog-to-digital converters, digital-to-analog converters, effect generators, autotune/retuning devices, and so on), digitally communicate via standardized networking protocols over ethernet and/or Wi-Fi on a Local Area Network. For example, in many cases, different audio production appliances may communicate with one another, and/or control one another, (e.g., receive and/or send command and control instructions) digitally over TCP, UDP, or other protocols.

In many cases, one or more appliances can define a "control surface" including a number of mechanically or digitally repositionable controls, such as slides, dials, switches and so on. Inputs provided to these controls can trigger command and control instructions to be sent (via a local area network) from the control surface to a particular audio production appliance. For example, a slide of a control surface can be configured to control gain applied by an amplifier, separate from the control surface itself.

Further, an audio workstation may—and often does—include two or more audio production appliances manufactured by different manufacturers. In many cases, different appliances implement different command and control protocols, some of which may be custom and/or undocumented. For example, in some cases, a particular manufacturer's equipment or appliances may communicate over custom ports with encrypted or undocumented protocols only accessible or usable by particular hardware and/or particular licensed software.

Furthermore, in many cases, especially for audio workstations incorporating older hardware appliances, a particular manufacturer may require fixed IP addresses and/or particular address spaces for networked control of that manufacturer's equipment.

To account for these and other complexities introduced by multi-manufacturer, multi-protocol, audio workstations, the embodiments described herein leverage custom-configured network appliances installed at multiple sites, such as at a venue site (herein "on-site") and at a remote production studio or remote production site (herein, "off-site").

Once coupled to the open internet via local area networks (and/or wide area networks, such as over a cellular network) at each site, each custom-configured network appliance can be configured to communicably couple to an IP address management service configured to define a common addressing space for two or more sites (e.g., such that a first set of addresses assigned to network devices at a first site does not intersect a second set of addresses assigned to network devices at a second site). In this manner, both old and new hardware, regardless of manufacturer, can communicably intercouple without risk of overlapping addresses or other communication interferences associated with traditional virtual private networks. More generally, an off-site control surface of an audio workstation can send command and control instructions to an on-site audio workstation and/or more specifically a control surface of an on-site audio workstation. The workstations may both be digital or analog, or in some cases, an off-site workstation may be digital while the on-site workstation is analog.

More generally and broadly, described embodiments include methods of leveraging using a first audio workstation to provide on-site audio mixing, with a separate off-site audio workstation operated by a remote producer (producer)

and configured to control operations of the first audio workstation, via a network formed by communicably intercoupled network appliances installed either permanently or temporarily at both sites.

The foregoing and following embodiments described herein can be leveraged to provide for remote audio production of a number of live events including musical events, education events, conferences, sporting events, and so on. Further, although many embodiments described herein relate to audio production, it may be appreciated that the systems and methods described herein can be equivalently applied to other live event production exercises, such as and including video production, lighting production, and so on.

More generally and broadly, a "live event" as described herein is an event that contemplates that one or more artists, participants, athletes, speakers, and/or performers create or modify sound to be received by an audience in the form of, for example, music, speech, or other audible performances or audio formats, whether single channel (e.g., mono) or multichannel (e.g., stereo, surround sound, and so on).

At a live event, as described herein, audio may be captured by one or more audio input/audio capture devices, such as microphones or pickups, or may be generated in response to an interaction with an instrument, such as a guitar, keyboard, and so on. As used herein, such audio capture devices may be referenced as "audio capturing" or "audio producing" devices and may include any device which captures audio generated by a particular source and/or any device which creates sound (e.g., an electronic keyboard). Examples of audio capturing or producing devices include microphones, electronic instruments, speakers, devices producing pre-recorded audio/music, and so on. In some cases, audio capturing or producing devices may capture analog signals, digital signals, or any combination thereof.

In many embodiments, audio capturing or producing devices may transmit digital or analog audio signals through the use of audio channels (e.g., more simply "channels") to other audio equipment, such as an audio appliance associated with and/or communicably, conductively, and/or optically coupled to an on-site audio workstation, as described herein. For a given live event, a number of audio channels is not limited to a particular number and, in some cases, a live audio performance may include 64-128 channels or more.

For simplicity of description, many embodiments that follow reference a digitally-implemented on-site audio workstation, or more simply known as a digital audio workstation. In these embodiments, the digital audio workstation software may be installed on any suitable electronic device, such as a computer and associated display. Example digital audio workstation systems include software such as, but not limited to, PRO TOOLS by AVID TECHNOLOGY, INC., ABLETON LIVE by ABLETON, and CUBASE by STEINBERG MEDIA TECHNOLOGIES.

In these embodiments, the on-site digital audio workstation may include and/or may be implemented as an instance of software instantiated by cooperation of a processor and a memory of a client device, such as a consumer laptop or computer provided at a venue of a live event. As noted above, the on-site audio workstation instance can be configured to process, in some manner, each of the input channels and may cause manipulation of the audio data from the input channels before generating an output signal (e.g., a multi-channel output).

For example, the on-site audio workstation may control signal gain, equalization settings, frequency curves, channel mute, auxiliary send levels, panorama, fader levels, and so on. In some cases, the on-site audio workstation may be configured to record channel audio data and/or output audio data and may transmit backup or live audio data to separate systems and/or to various memories. Though an on-site audio workstation is described as being a mixing tool, it is appreciated that any mixing desk, audio workstation, mixing board, and so on, may be used instead of, or in addition to, a digital audio workstation. For example, an on-site physical mixing board may replace the digital audio workstation in some embodiments.

After manipulating audio data from a set of channels, the on-site digital audio workstation may generate a multi-channel output such as a stereophonic (e.g., stereo) output, a monophonic (e.g., mono) output, a 5.1 channel output (e.g., a front left channel, a front right channel, a center channel, left and right surround channels, and a subwoofer channel), or any other audio output as may be broadcast and received at consumer or professional devices.

This multi-channel output may be transmitted to broadcast electronics for, for example, television or radio broadcast, and may represent a professionally-produced audio feed as of a live event. In other cases, the multi-channel output may be provided to an on-site audio system.

As noted above, in many embodiments, the on-site audio workstation may be securely internetworked with an off-site audio workstation. In such examples, the multi-channel output and/or any one or more channels (either raw or as output from one or more audio appliances), as transmitted to broadcast electronics and/or amplified on-site, may be transmitted to a remote producer over a secure channel established over a computing network that may include the open Internet.

The multi-channel output (referred to herein as "reference audio" or "monitor audio") transmitted to the remote producer may be a reference audio output and may be separate and distinct from a main audio output heard by listeners of a broadcast (e.g., over the radio or on a television). The reference audio output may be listened to by a remote producer as an approximation of the main audio output. In this manner, errors in transmission due to network interruptions of the reference audio output are not propagated within the main audio output.

As noted above and with respect to other embodiments described herein, the remote producer may control an off-site digital audio workstation or mixing station including various knobs, buttons, levers, dials, and so on. The remote producer may listen to the reference audio output to determine whether the performance audio needs to be adjusted or modified in some manner. For example, if a singer's voice in the reference audio output is too quiet, the remote producer may determine that a gain associated with the relevant channel needs to be increased. In response, the remote producer can provide an input to his or her off-site digital audio workstation which, as noted above, generates a command and control instruction that is transmitted via the network to the on-site digital audio workstation which executes the instruction to cause a change to on-site produced audio.

These foregoing and other embodiments are discussed below with reference to FIGS. 1A-4. However, those skilled in the art will readily appreciate that the detailed description given herein with respect to these figures is for explanatory purposes only and should not be construed as limiting.

FIG. 1A depicts an example audio mixing system 100, such as described herein. In some cases, the audio mixing system 100 may include an on-site location 102 and an off-site location 104 communicatively coupled via a network 106. The network 106 may be any type of public or private network and may include the open Internet.

In some cases, a preconfigured network appliance may be provided at the on-site location 102 and a preconfigured network appliance may be provided at the off-site location 104. The preconfigured network appliances can include one or more firewalls, routers, gateways, or other suitable networking appliances.

In some cases, the preconfigured network appliances can each be a single electronic device. In other cases, the preconfigured network appliances can each include a number of purpose-configured electronic devices; each preconfigured network appliance can include a modem, a router, an access point, a gateway, a firewall, and so on. A person of skill in the art may appreciate that many networking appliances may be suitable in many embodiments.

Generally and broadly, each on-site preconfigured network appliance and the off-site preconfigured network appliance may be configured to (on power-up, on a schedule and/or in response to an instruction from an administrator of the preconfigured network appliance(s)) automatically couple to a server executing an instance of an IP address management service, as described herein.

The server can be issued and/or may be associated with a fixed IP address and/or a known domain name. In this manner, each of the preconfigured network appliances can automatically connect to the IP address management service from any local area network.

The on-site location 102 may include one or more audio capturing or producing devices 108, signal processing electronics 110, an on-site audio workstation 112, and an audio transcoder 114. The on-site audio workstation 112 and/or the audio transcoder 114 can be configured to communicate with an off-site audio workstation 116 located at the off-site location 104. More specifically, the on-site audio workstation 112 can be configured to receive command and control instructions from the off-site audio workstation 116 and the audio transcoder 114 can be configured to transmit a digital representation of one or more channels produced by or received as input by the on-site audio workstation 112. In some cases, the audio transcoder 114 can be configured to transmit to the off-site workstation 116 a reference audio signal, such as described above.

In addition, the on-site location 102 can be provided with one or more broadcast electronics 118 configured to transmit produced audio output from the on-site audio workstation 112 to one or more remote audience members and/or to one or more on-site sound systems.

As may be appreciated in view of other embodiments described herein, the on-site location 102 may be a building, compound, or venue that is hosting a live event. For example, the on-site location 102 may be a concert hall, sports arena, or festival venue.

In some cases, one or more performers may be present at the on-site location 102. The one or more performers may include presenters, athletes, musicians, singers, lecturers, and/or any entertainer or person or group. In some cases, the one or more performers may be positioned on a stage or performance location at the on-site location 102 and may provide output that can be captured by the audio capturing or producing devices 108. Examples of audio capturing or producing devices 108 include microphones, musical instruments, pre-recorded audio (e.g., from a computer memory or a speaker), digital effect generators, pickups, and so on. In some cases, the audio capturing or producing devices 108 may transmit audio signals to multiple devices such as a live, on-site audio feed, a remote audio feed, a broadcast feed, a feed that directs back to the one or more performers for audio reference, any combination thereof, and so on.

Audio signals captured or produced by the audio capturing or producing devices 108 may be transmitted to signal processing electronics 110, which can include one or more audio production appliances as described above.

In some cases, the audio signals may be embodied as digital or analog electrical signals and may traverse conductive wires, electrical cables, electrical traces, and so on. In additional or alternative cases, the audio signals are digital, acoustic, optical, and so on and may move through optical waveguides, such as fiber optic cables, acoustic waveguides, and so on. Any combination of electrical signals, digital signals, acoustic signals, optical signals, and so on may be used as audio signals and may be transmitted over, for examples, wires and/or waveguides.

In additional or alternative embodiments, wireless signals containing audio data may be transmitted over a public or private network (e.g., some audio capture devices may be wireless and may communicate over a wireless protocol), such as the Internet or any other public network. The signal processing electronics 110 may modify, modulate, transmit, convert, or otherwise affect qualities of any audio signal.

The signal processing electronics 110 may include audio signal modulators which, in some cases, may be controlled by some of the one or more performers. The signal processing electronics 110 may additionally include various processors, digital-to-analog converters, analog-to-digital converters, amplifiers (e.g., preamps), and so on. In some cases, the signal processing electronics 110 may be omitted and audio signals may be transmitted directly from the audio capturing or producing devices 108 to the on-site audio workstation 112 and/or the audio transcoder 114 (via, for example, a signal splitter).

As described above, the on-site audio workstation 112 may be a computer program instantiated and executed over physical resources of an electronic device (e.g., a computer comprising one or more processors and one or more memories). The on-site audio workstation 112 may be one or more of any number of commercially available digital audio workstations. A user interface of the on-site audio workstation 112 may be rendered on an electronic display and may include tools for visualizing and/or mixing an audio input comprising one or more audio channels.

In some cases, the audio input may comprise multiple channels, where each channel corresponds to a unique audio capturing or producing device 108. In some cases, a number of available channels may be between 64-128 or more. In alternative examples, the number of available channels may be five or more or may be any number corresponding to unique sound producing elements.

The on-site audio workstation 112—together with one or more audio production appliances coupled thereto—may mix, or blend, the audio data associated with each channel together to produce a multi-channel or single-channel output. For example, the on-site audio workstation 112 may change a gain, volume, fader level, panorama level (e.g., pan), equalization level, and so on, of one or more channels. In some cases, the on-site audio workstation 112 may be able to change properties of the audio data of individual channels with respect to other channels (e.g., by boosting a volume of only one particular channel). In some cases, the on-site audio workstation 112 may include multiple user interface (UI) elements that are interactable through the use of an input device (e.g., a touchscreen, mouse, and/or keyboard).

In some cases, as noted above, the on-site audio workstation 112 may be controlled by a professional audio producer whereas in other cases, the on-site audio workstation 112 may be unattended at the on-site location 102 controlled exclusively by an off-site audio producer.

The channels of audio data input to the on-site audio workstation 112 may be mixed as a multi-channel output (e.g., a monophonic, stereophonic, 5.1 multi-channel output, and so on) suitable for broadcast (e.g., as a live-stream) or storage (e.g., in a computer memory). In some cases, the on-site audio workstation 112 may duplicate the multi-channel output and transmit the duplicate multi-channel outputs to different devices. For example, as depicted in FIG. 1A, one multi-channel output (e.g., a main multi-channel output) may remain at the on-site location 102 and may be transmitted to the broadcast electronics 118 and a second, duplicate multi-channel output (e.g., a reference multi-channel output) may be sent to an audio transcoder 114 and may be transmitted, over a network 106, to the off-site location 104.

In some cases, the two (or more) multi-channel outputs may be transmitted to different devices. For example, one multi-channel output (e.g., the main multi-channel output) may be transmitted to the broadcast electronics 118. The broadcast electronics 118 may include monitors, processors, satellites, and so on, and may broadcast the multi-channel output along the electromagnetic spectrum portion associated with the television or radio broadcast. In some cases, the broadcast electronics 118 may include electronics to transmit audio and/or video signals over a network (e.g., the Internet or any other public network) and/or through a host service.

Another multi-channel output (e.g., the reference multi-channel output) may be sent to the audio transcoder 114 rather than to the broadcast electronics 118. In some cases, the audio transcoder 114 may be configured to store (e.g., in a computer memory) a recording of the reference multi-channel output and/or may transmit the reference multi-channel output across a network 106.

In some cases, the audio transcoder 114 may be a second electronic device (e.g., computer) separate from the first electronic device comprising the on-site audio workstation 112. In alternative or additional embodiments, the audio transcoder 114 and the on-site audio workstation 112 may be separate programs, or components, installed on the same electronic device. In some cases, such as when a main multi-channel output is corrupted or lost, the audio transcoder 114 may act as a broadcast backup and may transmit the backup multi-channel output to the broadcast electronics 118.

As discussed above, the audio transcoder 114 may transmit a multi-channel output to the off-site location 104, via a network 106. The network may be wired, wireless, or any combination thereof, and may utilize the Internet or any other public network. The off-site location 104 may include the off-site audio workstation 116. In some cases, the off-site audio workstation 116 may be, or include, a digital audio workstation separate from the on-site audio workstation 112 at the on-site location 102. In alternate or additional embodiments, the off-site audio workstation may be a mixing board and may include physical knobs, levers, switches, and so on, with which an off-site professional audio producer may physically interact. In some cases, the off-site digital audio workstation 116 may be coupled to a mixing board at the off-site location 104.

For clarity, it is noted that, in some cases, one multi-channel output (e.g., a main multi-channel output) may remain on the on-site location 102 until broadcast. The main multi-channel output may be the audio output that viewers/listeners receive (e.g., a television, personal computer, or radio). The second multi-channel output (e.g., a reference multi-channel output) may refer to the multi-channel output sent to the off-site location 104 by the audio transcoder 114.

The reference multi-channel output may be used primarily, or exclusively, for monitoring purposes and may, in some cases, never be received, viewed, or listened to by the viewers/listeners of the live event. It is additionally noted that, while the main multi-channel output and the reference multi-channel output may initially be exact duplicates of one another, a certain amount of drift, delay, or de-synchronization may occur in either multi-output channel as the multi-output channels are transmitted through various networks and/or electronics.

The off-site professional audio producer, at the off-site location 104, may receive the reference multi-channel output (e.g., from the audio transcoder 114) and may determine that certain mixing controls of the on-site audio workstation 112 need to be changed or modified. For example, if a particular singer is singing too loudly, the off-site professional audio producer may change a gain of the associated audio channel. As the reference multi-channel output is not a broadcast feed, the off-site professional audio producer may desirably want to change the mix of the main multi-channel output as produced at the on-site audio workstation 112 on the on-site location 102.

To change operations of the on-site audio workstation 112, the off-site audio workstation 116 may be communicatively coupled with the on-site audio workstation 112 such that inputs made on the off-site audio workstation 116 are mirrored, or duplicated, at the on-site audio workstation 112.

To achieve this objective, the off-site audio workstation 116 and the on-site audio workstation 112 may access the same local computing network. In these examples, commands provided by the off-site professional audio producer can be conveyed via the computing network to one or more audio appliances at the on-site location 102. In these constructions, the off-site location 104 may be physically proximate to the on-site location 102.

In these constructions, because both audio workstations are on the same local network, commands transmitted by the off-site audio workstation can be directed to locally-assigned IP addresses of particular audio equipment at the on-site location 102.

In many cases, the off-site audio workstation 116 can directly command and control the on-site audio workstation 112, which in turn can command and control one or more signal processing electronics 110 and/or one or more audio production appliances at the on-site location 102. For example, if the off-site professional audio producer modifies an angular position of a dial on the off-site audio workstation 116, the corresponding dial (or virtual dial) may be changed by an equivalent degree on the on-site audio workstation 112 which, in turn, may send a command to an appropriate audio appliance to change—in one example—a gain applied by that appliance to a particular audio channel provided as input to that appliance.

Further, it is appreciated that an off-site professional audio producer or audio engineer in charge of producing a multi-channel output may need to make minor, or major, adjustments to on-site audio production equipment quickly, in near real-time.

In some cases, the control signals generated at the off-site audio workstation 116 may travel through the network 106 and the audio transcoder 114 before arriving at the on-site audio workstation 112.

In other examples, the off-site audio workstation 116 and the on-site audio workstation 112 may each be coupled to different local area networks, which as known to a person of skill in the art, may typically be associated with a locally-controlled DHCP server responsible for address assignment and resolution on each respective local area network.

As noted above, this conventional topology presents many problems when two local area networks are inter-coupled, for example by a tunnel or virtual private network. For example, in many conventional examples, a virtual private network is typically constructed to retain local address spaces at each local area network. For example, a first endpoint of a virtual private network may assign addresses within a first range and a second endpoint of the virtual private network may assign addresses within a second range. The virtual private network may enable communication between devices on each end, but in many cases, the address spaces are different and/or addresses may overlap, introducing communication ambiguities that can interfere with intended operation of one or more network services.

This may be particularly true for rudimentarily-implemented audio production appliances, many of which may require a static IP address and/or a long-lease IP address in order to function properly. More specifically, some audio production appliances (e.g., mixers, amplifiers, and the like) may have atypical and/or custom implementations of network communication protocols and, thus, such devices may struggle to effectively receive and/or send commands over a virtual private network or a tunnel.

Further to the foregoing, different venue sites may include different physical hardware, some of which may be compatible with virtual private networks, some of which may not.

In order to account for these and other drawbacks of conventional virtual private networks implemented in audio production environments, the embodiments described herein reference constructions in which custom preconfigured networking appliances are installed at each site. In particular, a first preconfigured networking appliance is installed at the on-site location 102 and a second preconfigured networking appliance is installed at the off-site location 104.

Each of the preconfigured networking appliances are configured to be coupled to a site-specific local area network that is, in turn, connected to the open internet. In some cases, the preconfigured networking appliances may include a cellular failover and/or a cellular primary modem but this is not required of all embodiments.

In many examples, the preconfigured networking appliances can be configured to automatically phone home to a known fixed IP address or hostname when the respective preconfigured networking appliance is assigned an IP address by a local DHCP server and/or upon the preconfigured networking appliance determining (e.g., via captive page detection) that an open connection to the internet is available to the preconfigured networking appliance.

The fixed IP address and/or hostname can be associated with an IP address management service, which may, in many examples, provide a remotely-managed DHCP service. In other words, the IP address management service can be configured to automatically establish a virtual private network between each site and, additionally, define a common address space shared by both sites. In this manner, it is guaranteed that no two devices at either site share a single IP address.

In some cases, the fixed IP address and/or hostname that points to the IP address management service (which may be a cloud-based service) can be stored in a configuration file accessible to each of the preconfigured networking appliances. In other cases, each of the preconfigured networking appliances can be configured with a static IP address which, when accessed by each respective preconfigured networking appliance, serves as a configuration file that provides each preconfigured networking appliance with an address or hostname of the IP address management service.

In this manner, more generally and broadly, the preconfigured networking appliances are configured to create a command and control network between two geographically separate sites; when a preconfigured networking appliance is installed on-site, it may automatically connect to a remote IP address management service in order to assign IP addresses to one or more audio production appliances on-site and/or one or more on-site workstations, such as the on-site audio workstation 112.

As a result of these constructions, commands provided by the off-site professional audio producer to the off-site audio workstation 116 can be conveyed via the single-address space virtual private network to one or more audio appliances and/or to the on-site audio workstation 112 at the on-site location 102.

More particularly, as with preceding examples, the off-site audio workstation 116 can directly command and control the on-site audio workstation 112, which in turn can command and control one or more signal processing electronics 110 and/or one or more audio production appliances at the on-site location 102. For example, if the off-site professional audio producer modifies a linear position of a slider on the off-site audio workstation 116, a corresponding slider (or virtual slider) may be changed by an equivalent amount on the on-site audio workstation 112 which, in turn, may send a command to an appropriate audio appliance to change—in one example—a gain applied by that appliance to a particular audio channel provided as input to that appliance.

These foregoing embodiments depicted in FIG. 1A and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 1B:
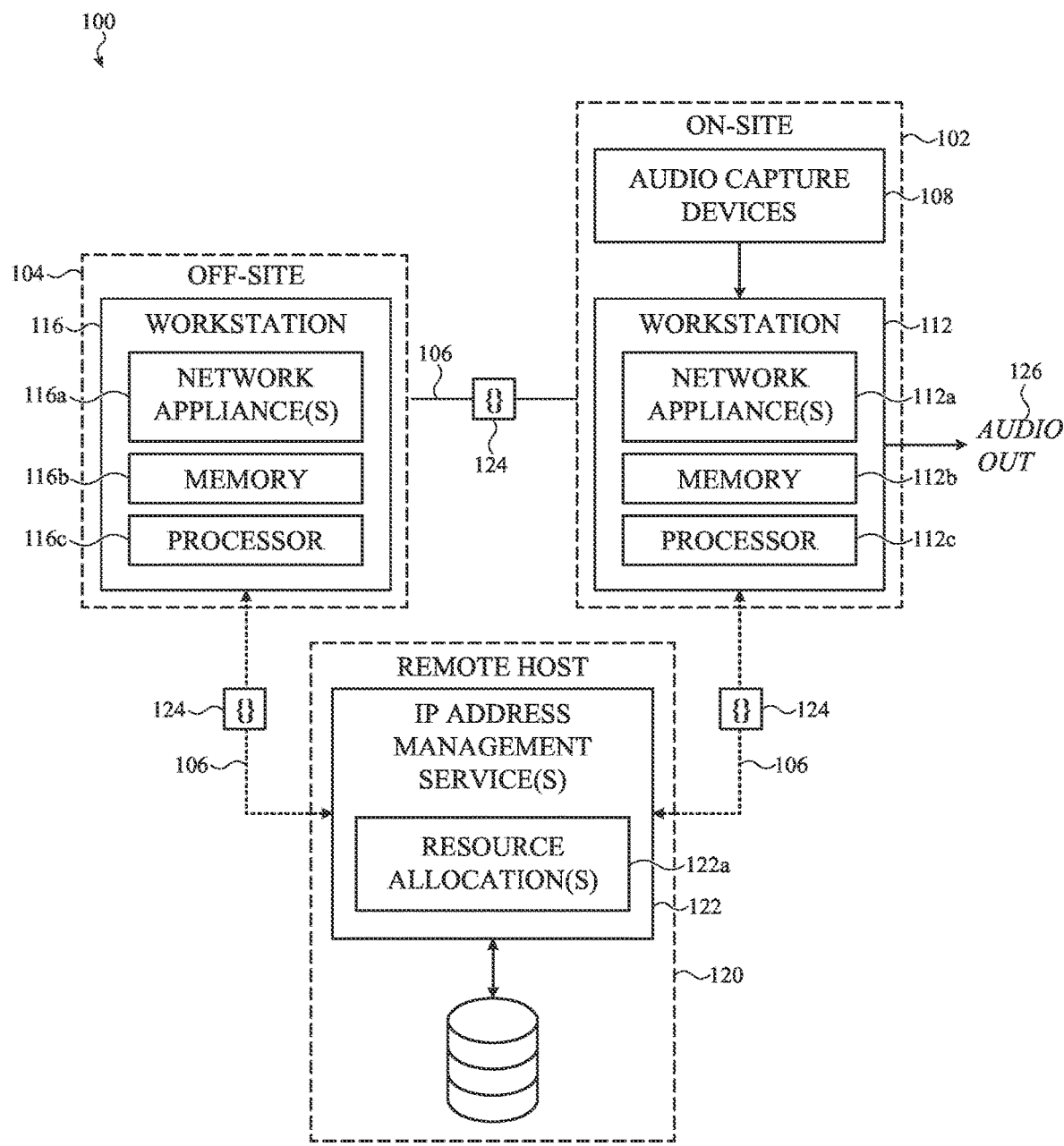

For example, it may be appreciated that the system may be implemented in a number of suitable ways. For example, FIG. 1B depicts the audio mixing system 100, including the on-site location 102 and the off-site location 104 coupled by a network 106, which in this example architecture may be a virtual private network having a shared address space across both sites defined at least in part and/or managed by a remote server or cloud infrastructure 120 over which an IP address management service 122 is instantiated and executes.

In particular, in these examples, the off-site workstation 116 can be configured to receive inputs from an audio producer (such as to digital or physical control surfaces or controls, such as sliders, dials, and the like). These inputs can be packaged as command and control instructions 124, and may be transmitted as structured data via the network 106 to the on-site audio workstation 112 which, as noted above, can execute the command and control instructions to modify one or more audio channels provided as input to the on-site audio workstation 112 by one or more audio capture devices 108. In this manner, the on-site audio workstation 112 can cause to be output produced audio 126. The audio output 126 can be provided as input to a venue sound system and/or to one or more broadcast electronics devices or audio transcoders.

The audio workstations, both on-site and off-site can be implemented with any suitable hardware, software, or combination thereof. In many examples, at least a portion of each audio workstation is implemented in software which may be configured to execute over physical resources allocated for each audio workstation, such as a processor and a memory associated with a computing device (e.g., laptop computer, desktop computer, and so on).

In addition, each audio workstation, as noted above, can be coupled to and/or can include one or more network appliances that can be preconfigured as described above to automatically couple to the IP address management service 122. After communicably coupling to the IP address management service 112, each respective preconfigured network appliances can be configured to manage network communications by and between the on-site audio workstation 112 and the off-site audio workstation 116 and the audio appliances associated therewith.

In the illustrated embodiment, each of the workstations is depicted as including at least a processor, a memory, and a network appliance. In particular, the on-site audio workstation 112 includes a network appliance 112a, a memory 112b, and a processor 112c. In addition, the off-site audio workstation 116 includes a network appliance 116a, a memory 116b, and a processor 116c. Each of these respective network appliances, memories and processors can be configured to cooperate to perform, coordinate, schedule, or otherwise execute one or more operations or functions of each respective audio workstation.

Similarly, the IP address management service 122 can be configured to execute over one or more physical or virtual resources 122a allocated by the remote host and/or cloud infrastructure 120 for the IP address management service 122. In many cases, the IP address management service 122 may be coupled to one or more databases, which can be leveraged in some embodiments to store IP address tables and/or IP address or hostname assignments for particular sites.

These foregoing embodiments depicted in FIGS. 1A-1B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
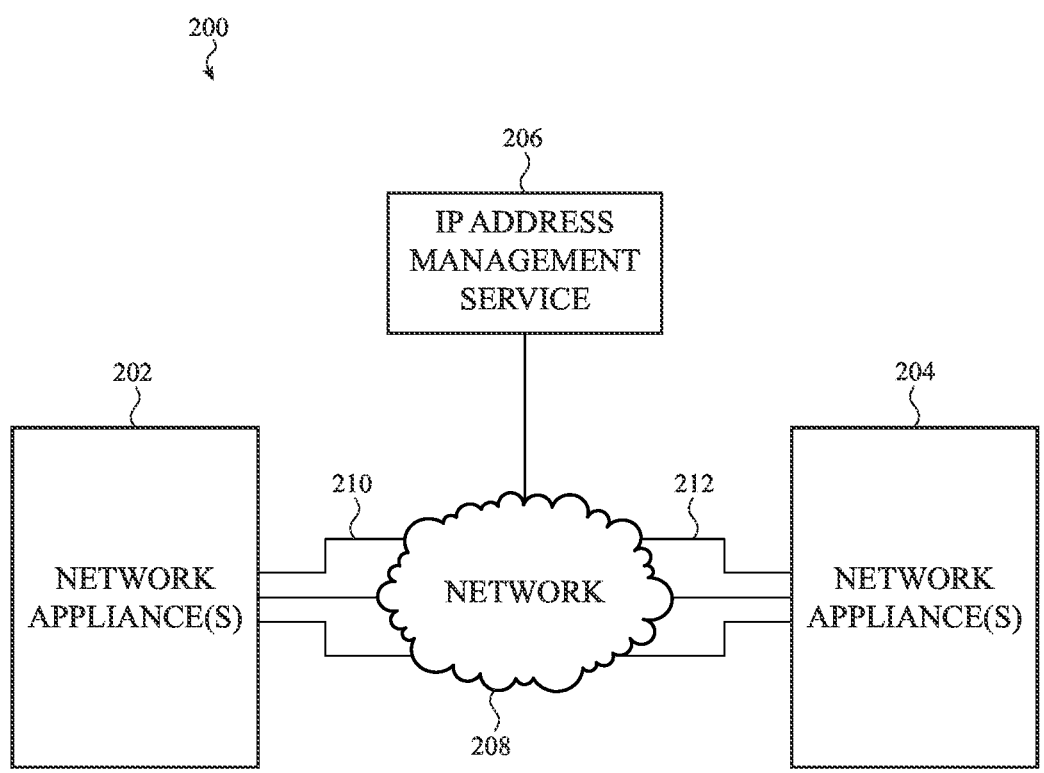
FIG. 2 illustrates an example network configuration for remotely controlling a digital audio workstation through the use of an audio workstation, such as described herein.

For example, FIG. 2 illustrates an example network configuration 200 for remotely controlling a digital audio workstation. The network configuration 200 may include an on-site network appliance 202 (e.g., a router and/or other network element present at the on-site location 102, as depicted in FIG. 1A), an off-site network appliance 204 (e.g., a router and/or other network element present at the off-site location 104, as depicted in FIG. 1A), and a central IP address management service server 206.

Each of the network appliances 202, 204 and the central IP address management service server 206 may be connected through a network 208 (e.g., the Internet or any other public network). In some cases, the network configuration 200 may be a Virtual Private Cloud (VPC) network and the central IP address management service server 206 may be a cloud-based server as operated by cloud-based service providers. In some cases, the on-site network appliance 202 may be coupled to on-site devices (e.g., audio capturing or producing devices and the digital audio workstation) and the off-site network appliance 204 may be coupled to remote devices (e.g., an off-site mixing station).

Under circumstances where separate DHCP servers are associated with each network appliance 202, 204, an internet protocol (IP) address (e.g., IPv4) conflict may occur when the routers are communicatively coupled via, for example, an extended network. For example, as noted above, a number of devices at an on-site location may be assigned IP addresses by a first DHCP server and a number of devices, or channels, at an off-site location may separately be assigned IP addresses by a second, separate DHCP server.

To prevent any IP address conflict, respective DHCP servers of the on-site network appliance 202 and the off-site network appliance 204 may be disabled, or otherwise deactivated, when the respective appliances are installed/configured and a central IP address management service server 206 may be provided to assign unique IP addresses to devices coupled to the on-site network appliance 202 and the off-site network appliance 204. The unique IP addresses may be assigned to guarantee that no IP address overlap occurs, according to any assignment protocol such as first-come-first-served, fixed assignment for particular devices (e.g., the digital audio workstation), and so on.

As noted with respect to other embodiments described herein, each of the network appliances 202, 204 may be preconfigured to establish secure Virtual Private Networks (VPNs) that permit the secure transmission of data and/or data packets. For example, an on-site network appliance 202 may be preconfigured and may be transported to an on-site location.

A corresponding off-site network appliance 204 may additionally be preconfigured and may be transported to a separate off-site location. The on-site network appliance 202 and the off-site network appliance 204 may, when activated, may utilize Layer 2 Tunneling Protocol (L2TP) to provide one or more tunnels over Layer 2 between the on-site network appliance 202 and the central IP address management service server 206 and between the off-site network appliance 204 and the central IP address management service server 206. Once the Layer 2 tunnels are established, data packets may bidirectionally flow across the established tunnels (e.g., over the on-site network appliance 202, the central IP address management service server 206, and/or the off-site network appliance 204). Data packets may include control information (e.g., from an off-site mixing station), a multi-channel output signal, and so on. In some cases, as the central IP address management service server 206 assigns unique IP addresses to on-site devices/channels and remote devices/channels and in accordance with established Layer 2 tunnels, the network configuration 200 may simulate a Local Area Network (LAN). In this way, off-site of a digital audio workstation using an off-site audio workstation may be provided over a network even in cases where the digital audio workstation would ordinarily require a LAN network to prevent, for example, IP address conflict.

In some cases, the IP address management service server 206 may additionally or alternatively be configured to connect the on-site network appliance 202 and the off-site network appliance 204 through Layer 3 such as an Internet Protocol Security (IPsec) VPN connection. The Layer 3 communications may act to encrypt or otherwise protect data packets moving through established Layer 2 tunnels. Through the IPsec VPN connection, a first secured tunnel 210 and a second secured tunnel 212 may couple the first and second network appliances 202, 204 to the network 208. Through the secured tunnels 210, 212, which may be VPN tunnels, an encrypted connection may be formed between the first and second network appliances 202, 204.

In some cases, a Layer 2 Tunneling Protocol (L2TP) may be used in combination with IPSec security (or, e.g., Generic Routing Encapsulation (GRE) security) to provide encrypted and/or secured tunnels between the on-site network appliance 202, the off-site network appliance 204, and the central IP address management service server 206. Through the use of this network configuration 200, control signals sent from the off-site network appliance 204 may control operations of a digital audio workstation, through the on-site network appliance 202, without requiring a Local Area Network (LAN) connection.

It is additionally noted that the network configuration 200 may operate under a hub and spoke architecture. For example, the central IP address management service server 206 may operate as a hub and network appliances 202, 204 may operate as spokes. In this way, the central IP address management service server 206 may broker data packets transmitted by the network appliances 202, 204 and may adapt/transmit outgoing data packets in a format expected by the network appliances 202, 204.

As the IP address management service server 206 may operate as a hub, multiple network appliances, including network appliances in addition to network appliances 202, 204, may additionally be provided as an additional spoke in certain embodiments. For example, in a potential system, one on-site network appliance and two remote network appliances may be provided, where the two remote network appliances are provided at different locations.

Since the IP address management service server 206 operates as a hub, a first off-site audio workstation associated with a first remote network appliance may control operations of a digital audio workstation associated with the on-site network appliance, as described herein. Continuing the above example, a second off-site audio workstation associated with a second remote network appliance may additionally control operations of the digital audio workstation. In this way, multiple off-site audio workstations controlled by different off-site professional audio producers may collaboratively control a single digital audio workstation through the use of mixing control data derived at any number of off-site locations.

Figure 3:
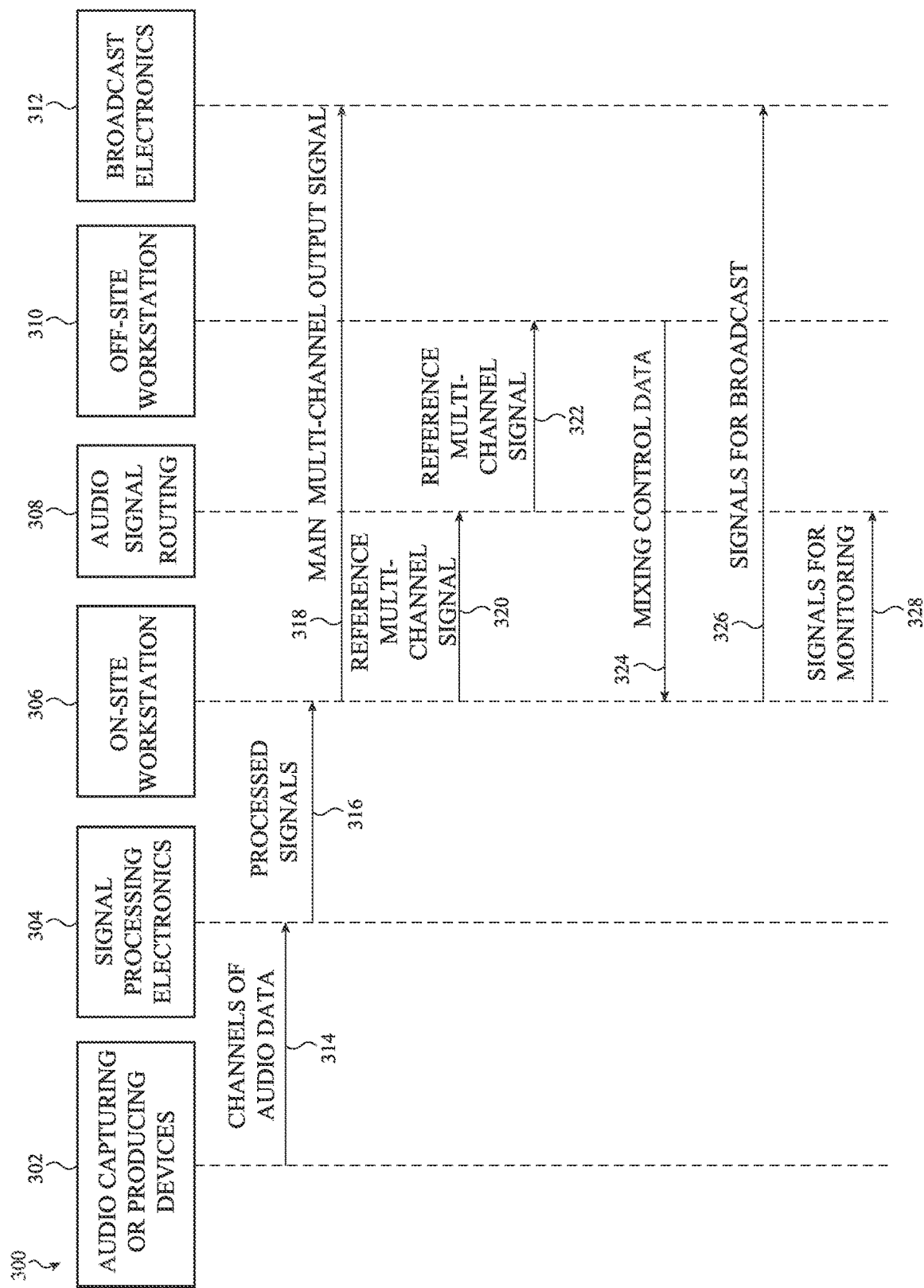
FIG. 3 illustrates a signal flow diagram that depicts example operational signals transmitted and received within an audio production system for generating a multi-channel output for an audio broadcast, such as described herein.

These foregoing embodiments depicted in FIG. 3 and the various alternatives thereof and variations thereto are presented, generally, for purposes of explanation, and to facilitate an understanding of various configurations and constructions of a network architecture, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIG. 3 illustrates an example audio production workflow 300 in accordance with structural components described with respect to FIGS. 1A-1B and 2. For example, the audio production workflow 300 depicts signals transmitted to, from, and between audio capturing or producing devices 302, signal processing electronics 304, an on-site audio workstation 306, an audio transcoder/router 308, an off-site audio workstation 310, and (optionally) broadcast electronics 312, which may also be referred to as audio output electronics.

In some cases, audio may be captured or generated from audio capturing or producing devices 302 (e.g., by microphones or musical instruments). The audio capturing or producing devices 302 may be communicatively coupled to signal processing electronics 304 (e.g., via wires configured to transmit electrical signals). Audio signals may be transmitted to the signal processing electronics 304 at operation 314. It is appreciated that the audio signals may be transmitted through any number of active channels, such as, but not limited to, 64-128 channels or more.

At operation 316, processed signals may be transmitted to an on-site audio workstation 306. As described with respect to FIG. 1A, the processed signals may be, for example, modulated signals or converted signals (e.g., analog to digital conversion) and may still comprise individual channels. Each of the channels may be transmitted to the on-site audio workstation 306.

At the on-site audio workstation 306, multiple multi-channel outputs may be generated. At operation 318, a main multi-channel signal may be transmitted to broadcast electronics 312. As described above, the main multi-channel signal may be suitable for broadcast and may be transmitted (e.g., via satellite) to listeners/viewers via television/radio.

At operation 320, a reference multi-channel signal may be transmitted to an off-site audio workstation 310. The reference multi-channel signal may begin as a duplicate of the main multi-channel output, but, instead of being transmitted to broadcast electronics 312, may instead be transmitted to the audio transcoder/router 308.

At operation 322, the reference multi-channel signal may be transmitted to the off-site audio workstation 310 by, for example, a tunnel defined over a cloud-based DHCP network, which may be provided at least in part by an IP address management service as described herein.

At operation 324, mixing control data may be transmitted from the off-site audio workstation 310 to the on-site audio workstation 306. The mixing control data may relate to mixing operations performed, by an off-site professional audio producer, at the off-site audio workstation 310. For example, the off-site professional audio producer may determine, based on the reference multi-channel output, to change a pan value of a certain audio channel.

The off-site professional audio producer may interact with an input element or control surface (e.g., knob) of the off-site audio workstation 310 thereby generating mixing control data. The mixing control data may then be transmitted to the on-site audio workstation 306, thereby changing a mix at the on-site audio workstation 306.

Operation 326 may occur after the mix generated at the on-site audio workstation 306 is changed as a result of the mixing control data. At operation 326, the new mix may be transmitted to the broadcast electronics 312 for broadcast, as described above. It is noted that such operations may occur continuously in real-time, such that signals for broadcast are continuously sent from the on-site audio workstation 306 to the broadcast electronics 312 regardless of whether mixing control data is received from the off-site audio workstation 310.

Further, at operation 328, audio signals for monitoring, in accordance with the new mix, may be transmitted to the audio transcoder/router 308 and, eventually, to the off-site audio workstation 310. It is noted that such operations may occur continuously in real-time, such that signals for monitoring are continuously sent from the on-site audio workstation 306 to the off-site audio workstation 310 regardless of whether mixing control data is received from the off-site audio workstation 310 in a preceding operation.

Figure 4:
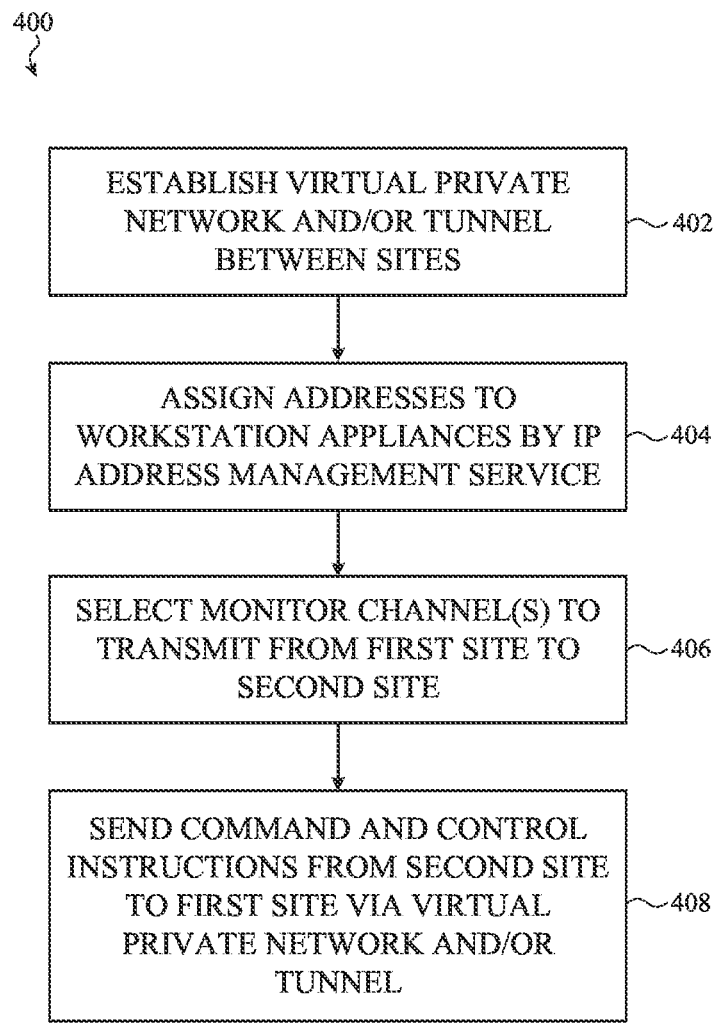
FIG. 4 is a flowchart corresponding to example operations of a method of operating an audio production system as described herein.

FIG. 4 is a flowchart that depicts example operations of a method of providing for off-site control of an on-site audio workstation. The method 400 includes operation 402 at which a virtual private network—with a common addressing space—is defined by two site-delivered preconfigured network appliances in cooperation with an IP address management service instantiated, in some examples, over cloud infrastructure. In other cases, the IP address management service may be instantiated over one or both of the site-delivered preconfigured network appliances.

The method 400 also includes operation 404 at which one or more addresses may be assigned by the IP address management service. These addresses may be assigned to an on-site workstation and/or to one or more audio appliances coupled to that workstation.

The method 400 further includes operation 406 at which one or more reference or monitor channels may be selected by an off-site producer. These signals may be digitized and/or compressed in order to transmit from a first site (e.g., on-site at a venue location) to a second site (off-site).

The method 400 also includes operation 408 at which a command and control instruction (or more than one) is transmitted from an off-site location to the on-site location via the virtual private network and/or tunnel established at operation 402. In this manner, control of the off-site audio workstation influences operations of the on-site audio workstation without requiring audio captured on-site to be physically mixed or modified by the off-site audio workstation.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The foregoing examples and description of instances of purpose-configured software and services, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first- or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. An audio production system comprising:
   a signal processor disposed at a first site and configured to modify an input audio signal in response to receiving as input one or more control instructions;
   a networking appliance disposed at the first site and configured to automatically establish a virtual private network between the first site and a second site, the networking appliance configured to use a defined common address space for the virtual private network such that a first set of addresses assigned at the first site does not intersect a second set of addresses assigned at the second site; and
   an on-site audio workstation disposed at the first site and coupled to the networking appliance and to the signal processor, the on-site audio workstation configured to receive control instructions, via the networking appliance over the virtual private network, from an off-site audio workstation disposed at the second site and automatically control one or more operations of the signal processor in response to the received control instructions.

2. The audio production system of claim 1, wherein the defined common address space is defined by an Internet Protocol (IP) address management service.

3. The audio production system of claim 2, wherein the IP address management service is remote to both the first site and the second site.

4. The audio production system of claim 1, wherein:
   at least one of the on-site audio workstation or the signal processor are configured to generate a reference audio signal; and
   the on-site audio workstation is configured to transmit, via the networking appliance, the reference audio signal to the off-site audio workstation.

5. The audio production system of claim 4, further comprising an audio transcoder, the audio transcoder configured to transmit the reference audio signal to the off-site audio workstation.

6. The audio production system of claim 4, further comprising an audio transcoder, the audio transcoder configured to transmit the reference audio signal to an off-site operator of the off-site audio workstation.

7. The audio production system of claim 1, wherein:
   the networking appliance is a first network appliance; and
   the first networking appliance is configured to automatically establish the virtual private network with a second networking appliance disposed at the second site.

8. The audio production system of claim 7, wherein:
   the off-site audio workstation is a first off-site audio workstation; and
   the first networking appliance is configured to automatically couple to a third site via the virtual private network and to receive command and control instructions from a second off-site audio workstation despised at the third site.

9. The audio production system of claim 7, wherein the first networking appliance is configured to automatically establish a Layer 2 tunnel to the second networking appliance.

10. The audio production system of claim 1, wherein at least one of the on-site audio workstation and the off-site audio workstation is a digital audio workstation.

11. The audio production system of claim 1, further comprising broadcast electronics configured to receive, as input, output of the signal processor, the broadcast electronics configured to transmit produced audio to a third site.

12. The audio production system of claim 1, wherein the control instructions comprise mixing control data.

13. A multi-site audio production system comprising:
    an address management system configured to define a common address space between multiple sites;
    a first site, at which is disposed a first networking appliance communicably coupled to the address management system and a first audio workstation communicably coupled to the first networking appliance; and
    a second site, at which is disposed:
      a second networking appliance configured to automatically establish, with the first networking appliance, a virtual private network between the first site and the second site and to automatically communicably couple to the address management system; and
      a second audio workstation coupled to the second networking appliance and comprising a control surface configured to receive an input from an operator, the second audio workstation configured to:
        generate a control instruction in response to the input; and
        transmit the control instruction, via the virtual private network, to the first audio workstation to cause a change in operation of the first audio workstation.

14. The multi-site audio production system of claim 13, wherein the control instruction causes a change in an operation of an audio appliance coupled to the first audio workstation.

15. The multi-site audio production system of claim 14, wherein the audio appliance comprises a signal processor configured to modify an attribute of at least one input audio channel.

16. The multi-site audio production system of claim 13, wherein:
    the audio appliance is a member of a set of audio equipment disposed at the first site and communicably coupled to the first audio workstation; and
    the set of audio equipment comprises at least one microphone.

17. The multi-site audio production system of claim 16, wherein the set of audio equipment comprises at least one pickup.

18. The multi-site audio production system of claim 13, wherein the virtual private network is established at least in part across the open Internet.

19. A method of operating a venue audio workstation, disposed at a venue, from an off-site audio workstation disposed at a remote site, the method comprising:
    communicably coupling a networking appliance, disposed at the venue, to the venue audio workstation;
    automatically establishing, by the networking appliance, a virtual private network to the remote site;
    communicably coupling, by the networking appliance, to an address management system configured to define a common address space for the virtual private network such that addresses assigned at the venue do not intersect with addresses assigned at the remote site;

receiving, via the networking appliance and the virtual private network, a command and control instruction from the off-site audio workstation; and executing the command and control instruction by the venue audio workstation to cause a change in at least one audio production appliance disposed at the venue and communicably coupled to the venue audio workstation.

20. The method of claim 19, further comprising transmitting monitor audio to the remote site from the venue audio workstation.

\* \* \* \* \*